US 6,538,967 B1

(12) United States Patent
Lee

(10) Patent No.: US 6,538,967 B1
(45) Date of Patent: Mar. 25, 2003

(54) METHOD AND APPARATUS FOR CONTROLLING A REPRODUCTION SPEED OF AN OPTICAL DISK

(75) Inventor: Ki Yeol Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,136

(22) Filed: Dec. 30, 1999

(30) Foreign Application Priority Data

Dec. 31, 1998 (KR) ............................................. 98-64115

(51) Int. Cl.[7] ................................................ G11B 5/09
(52) U.S. Cl. ................................ 369/47.46; 369/47.43; 369/53.3; 369/47.47
(58) Field of Search .............................. 369/53.2, 53.22, 369/53.3, 53.37, 47.37, 47.39, 47.43, 47.47, 53.23, 47.46; 360/73.3, 73.2, 69

(56) References Cited

U.S. PATENT DOCUMENTS

| 5,289,451 A | * | 2/1994 | Ashinuma et al. | ...... 369/53.22 |
| 5,761,699 A | * | 6/1998 | Hatanaka | ...................... 360/69 |
| 5,764,610 A | * | 6/1998 | Yoshida et al. | .......... 369/47.39 |
| 5,903,531 A | * | 5/1999 | Satoh et al. | .............. 369/44.29 |
| 5,903,536 A | * | 5/1999 | Lee et al. | ................. 369/44.23 |
| 5,963,517 A | * | 10/1999 | Nakagaki et al. | ........ 369/53.14 |
| 6,154,428 A | * | 11/2000 | Lee | .......................... 369/53.31 |
| 6,195,321 B1 | * | 2/2001 | Takamine et al. | ........ 369/47.44 |
| 6,195,322 B1 | * | 2/2001 | Ohtani et al. | ............ 369/53.28 |

FOREIGN PATENT DOCUMENTS

JP          0123320 A    *   4/1992

* cited by examiner

Primary Examiner—Thang V. Tran
(74) Attorney, Agent, or Firm—Birch, Stewart, Kolasch & Birch, LLP

(57) ABSTRACT

This invention provides method and apparatus for controlling a reproduction speed of an optical disk, which detects the condition of an optical disk and changes the reproduction speed automatically to a pre-determined speed corresponding to the detected disk condition. The method according to this invention comprises the steps of detecting the condition of an optical disk through the characteristics of an RF signal reproduced from the optical disk; adjusting the reproduction speed of the optical disk to a pre-determined speed appropriate for the detected disk condition. This invention enables a user to select the disk speed appropriate for the present operation condition under the possible maximum reproduction speed according to the type of optical disk, and eliminates the delay time caused from gradual speed reduction due to error correction failures at each speed by decreasing the current disk speed to the appropriate speed corresponding to the detected disk condition in advance before frequent reproduction errors occur.

8 Claims, 4 Drawing Sheets

| DISK CONDITION | | X |
|---|---|---|
| RF LEVEL | JITTER | |
| $V_{MAX} \sim 3/4*V_{MAX}$ | 1% | 32X |
| $3/4V_{MAX} \sim 1/2*V_{MAX}$ | 1% | 24X |
| $V_{MAX} \sim 3/4*V_{MAX}$ | 5~10% | 24X |
| LESS THAN $1/2*V_{MAX}$ | 1% | 16X |
| $3/4*V_{MAX} \sim 1/2*V_{MAX}$ | 5~10% | 16X |
| $V_{MAX} \sim 3/4*V_{MAX}$ | GREATER THAN 10% | 16X |
| ⋮ | ⋮ | ⋮ |
| DISK TYPE | | X |
| CD-ROM | | 16X, 24X, 32X |
| CD-RW (ON RECORDING) | | 1X, 2X, 4X |
| CD-RW (ON REPRODUCING) | | 8X, 16X, 24X |
| ⋮ | | ⋮ |

MEMORY'S CONTENTS

FIG.5

```
THE INSERTED DISK IS A WRITABLE ONE
PLEASE SELECT WHAT SPEED YOU WANT !

<REPRODUCTION SPEED>
  1. 32X       2. 24X       3. 16X
          <RECORD SPEED>
   4. 4X        5. 2X        6. 1X

* THE MAXIMUM SPEED FOR RECORDING IS 4X
```

DISPLAYED SCREEN

FIG.6

METHOD AND APPARATUS FOR CONTROLLING A REPRODUCTION SPEED OF AN OPTICAL DISK

BACKGROUND OF THE INVENTION

1. Field of the Invention

The present invention relates to method and apparatus for controlling a reproducing/recording speed of an optical disk in an optical disk device.

2. Description of the Related Art

FIG. 1 is a schematic block diagram of a general optical disk player, which comprises an optical pickup unit 11 for detecting recorded signals from an optical disk 10 inserted; a driver 21 for driving a sled motor 12a to move the optical pickup 11 and a spindle motor 12b to rotate the optical disk 10; an R/F unit 20 for equalizing and shaping the RF signal reproduced by the pickup 11 into binary signals; a servo unit 30 for controlling the optical pickup 11 and the driver 21; a digital signal processor (DSP) 30 for processing the binary signals from the R/F unit 20 into 14-bit EFM data; an EFM demodulator 50 for demodulating each 14-bit EFM data into a corresponding 8-bit data; a CIRC decoder 70 for detecting and correcting errors of the demodulated data in an ECC data block; and a controller 60 for controlling the servo unit 30 and the disk reproduction speed depending upon whether the data error is corrected or not.

The detailed reproduction operation of the optical disk player structured as above is as follows. First, the optical disk 10 is inserted and then starts to rotate. The recorded signals are reproduced as high frequency (referred as "RF" hereinafter) signals by the optical pickup 11. The reproduced RF signals are equalized and then converted into binary signals by the R/F unit 11.

Meanwhile, the controller 60 distinguishes the type of the inserted optical disk 10 based on the reproduced RF signals. For this type distinction, the controller 60 compares the reproduced signal level with the pre-determined standard level, and discriminates the type of the optical disk 10 according to the comparison result.

With regard to the comparison result, if the RF signal level is below the standard level, the controller 60 considers the optical disk 10 to be a writable one, for example CD-R or CD-RW, and if it is above the standard level, the controller 60 considers the disk 10 to be a read-only disk such as CD-ROM.

After the type of disk decision has been made, the controller 60 rotates the optical disk 10 at a reproduction speed according to the determined disk type. That is, the controller 60 applies a driving voltage corresponding to its maximum speed to the spindle motor 12b through the servo unit 30 and the driver 21 if the determined type is a read-only, and applies a driving voltage corresponding to the maximum speed divided by a predetermined value to the spindle motor 12b to rotate the optical disk 10 at a lower speed.

Under the condition that the disk 10 is being rotated at the chosen speed, the RF signals reproduced from the rotating optical disk 10 by the pickup 11 are converted into binary signals in the R/F unit 20 as explained above. The binary signals are restored into EFM modulated digital data by the DSP 30.

When the DSP 30 detects one or more data errors which may be caused from signal drop out etc. during the data restoring process, it generates an error-notifying signal and sends it to the controller 60. The EFM demodulator demodulates series of the restored 14-bit digital data into series of corresponding 8-bit data on the basis of the pre-stored EFM conversion table.

Meanwhile, when the specific signal indicating that the reproduction error is received from the DSP 30, the controller 60 controls the CIRC decoder 70 to try to correct the error of the demodulated digital data received from the EFM demodulator, so that the CIRC decoder 70 tries to recover the error data into normal data a preset number of times.

However, if the error data is not recovered to a normal data (even though the error correction process has been performed several times), the controller 60 controls the driving voltage applied to the spindle motor 12b through the servo unit 30 and the driver 21 to adjust the rotation speed of the optical disk 10 to a lower speed, re-detects the recorded signals of disk location where the error data is reproduced through the optical pickup 11, and then performs the above-explained error correction process again.

In the conventional reproduction method for an optical disk described hereinbefore, the reproduction speed of an optical disk is changed to a lower speed and then the corresponding data area is re-read if an error data, which may be caused from an abnormal disk condition, reproduced from an optical disk cannot be recovered to normal data even after error correction trials of the preset number. However, such retrials to correct error and data re-reading at a reduced speed causes delay time in reproduction, which results in discontinuity in video or audio being reproduced.

In addition, in the conventional optical disk player, the gain values of a servo unit for tracking and focussing servo control are selected from among only two values (appropriate for high and low speed), so that the tracking and focussing control of an optical pickup during the gradual speed adjustment cannot be performed accurately.

SUMMARY OF THE INVENTION

It is an object of the present invention to provide method and apparatus for controlling a disk speed in advance according to a distinguished disk condition to reduce delay time in reproduction while maintaining precise servo control.

In order to achieve the objective, another method according to the present invention comprises the steps of detecting a disk type or a disk condition based on the characteristics of a reproduced signal from an optical disk; displaying possible reproduction speeds on a screen according to the detected disk type or disk condition; and executing a servo control program appropriate for the reproduction speed selected from among the displayed reproduction speeds.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 5 shows a data storing example showing how possible reproduction speeds are related to the associated disk condition and disk type in a memory; and FIG. 6 shows a format example displaying reproduction speed information according to a detected disk type.

DETAILED DESCRIPTION OF THE PREFERRED EMBODIMENTS

In order that the invention may be fully understood, preferred embodiments thereof will now be described below with reference to the accompanying drawings.

Figure 1:
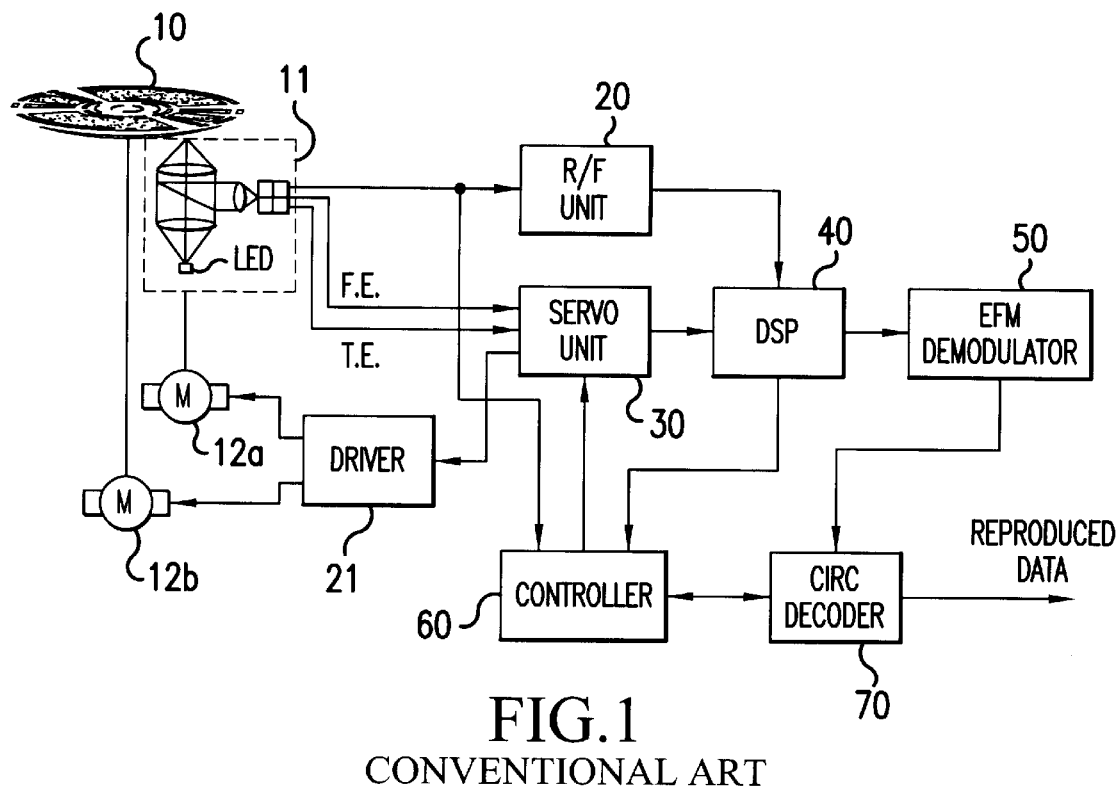
FIG. 1 is a schematic block diagram of a general optical disk player.
Figure 2:
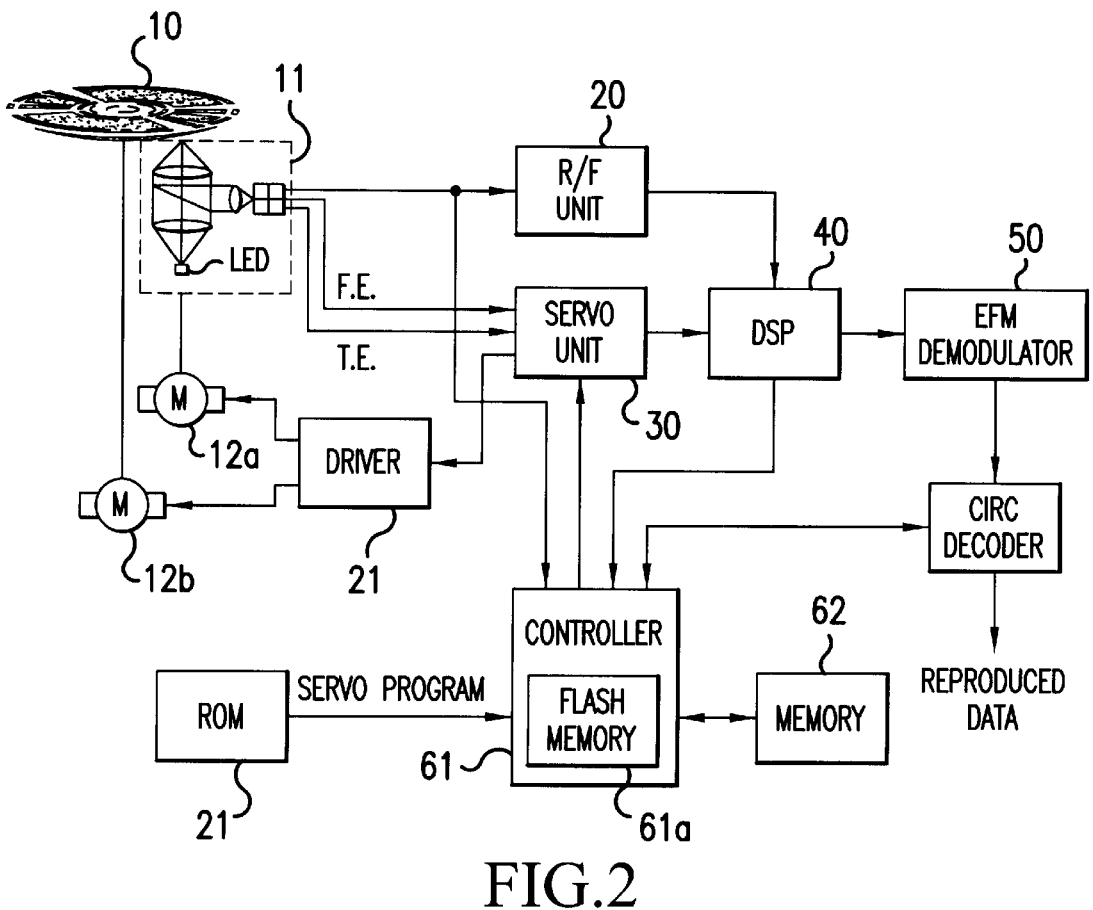
FIG. 2 is a schematic block diagram of an optical disk player where a preferred embodiment controlling the disk reproduction speed according to the present invention is embodied.

FIG. 2 shows a schematic block diagram of an optical disk player where a preferred embodiment adjusting the disk speed according to the present invention is embodied. The apparatus shown in FIG. 2 comprise the controller 61 for selecting and downloading a servo control program corresponding to the present reproduction condition for an optical disk 10 from an external ROM 100 into an internal flash memory 61a, and executing it; the memory 62 for storing applicable reproduction speed values in connection with corresponding disk type and disk conditions; and other elements for performing the same functions with the corresponding elements of FIG. 1.

Figure 4:
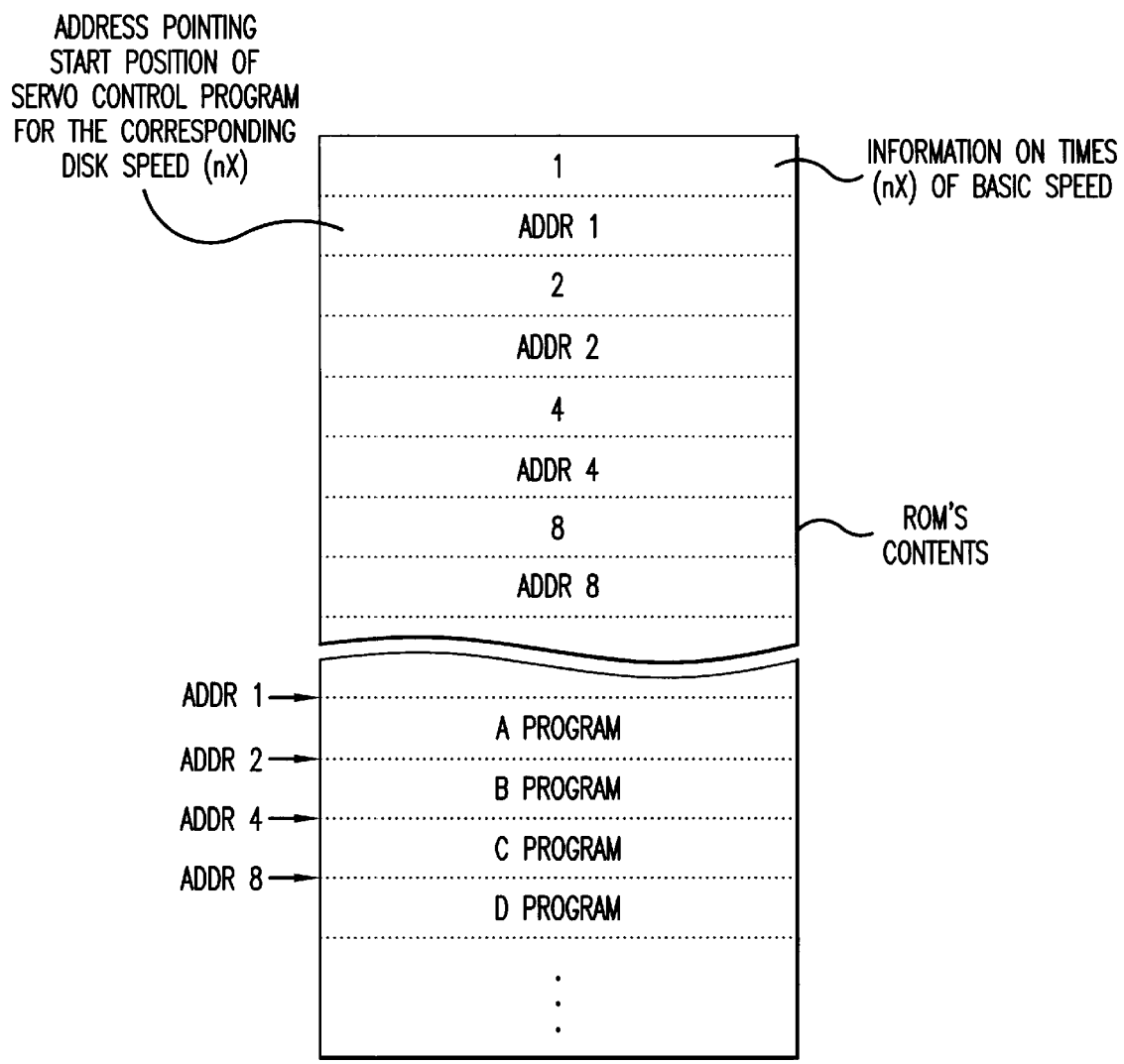
FIG. 4 shows a data storing example showing how servo control programs are related to the associated reproduction speeds in a ROM.

The ROM 100 contains data belonging to servo control programs and disk speeds which are linked to each other as shown in FIG. 4. The speed values, disk types (read-only or writable type), and disk conditions stored in the memory 62 are linked to each other as shown in FIG. 5.

Figure 3:
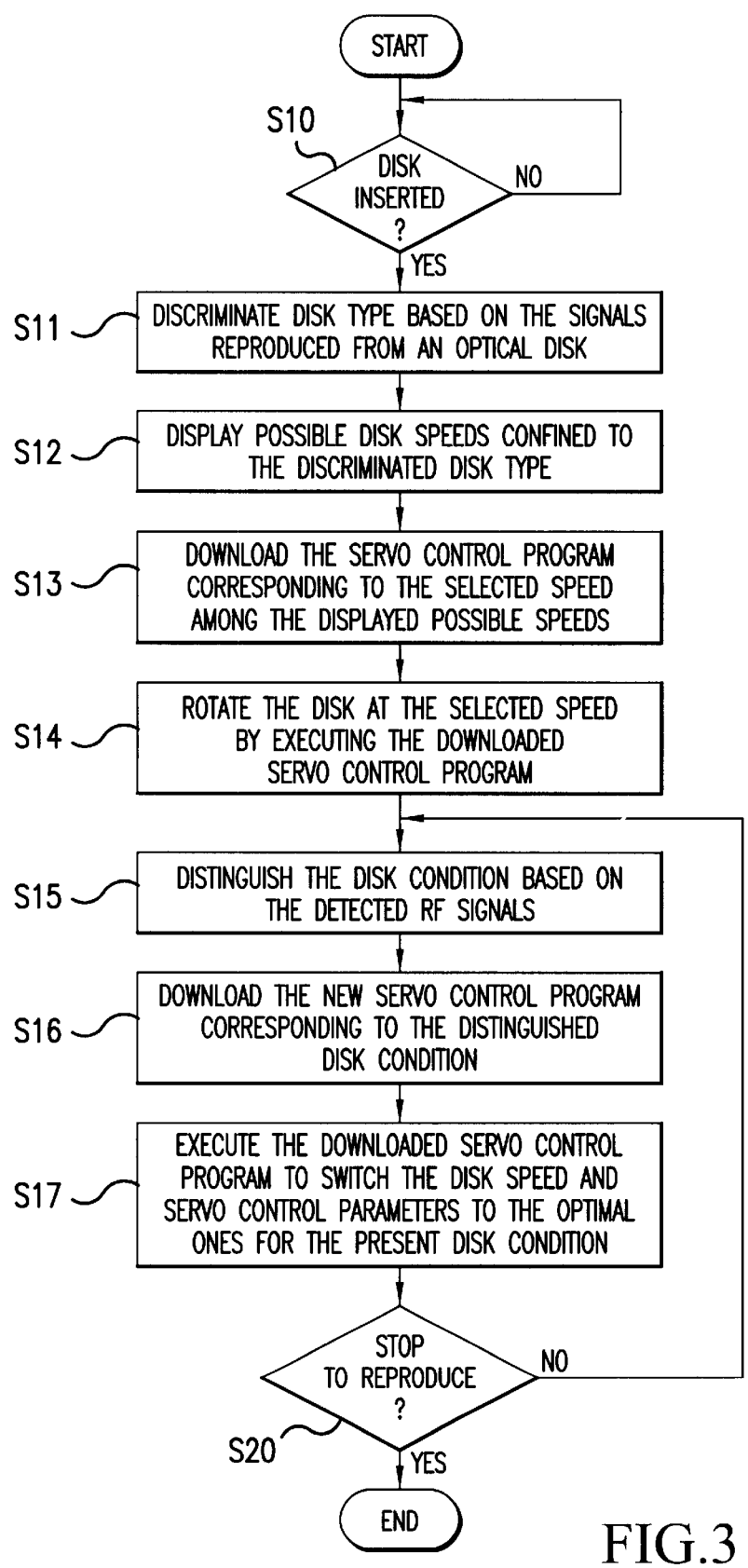
FIG. 3 is a flowchart showing a preferred method controlling the disk reproduction speed according to the present invention.

FIG. 3 is a flowchart showing a preferred method controlling a disk speed according to the present invention. Thee method of FIG. 3 for controlling a disk reproduction speed is described now in detail with reference to the block diagram of FIG. 2 and data stored examples of FIGS. 4 and 5.

When the optical disk 10 is inserted under the above-explained conditions, the controller 61 distinguishes a type of the inserted disk 10 by accomplishing the same operations that the conventional method does (S11). After the disk type discrimination, the controller 61 selects a predetermined reproduction speed corresponding to the discriminated type from the memory 62, and displays information on the selected reproduction speed and the disk type on a screen together with guide messages for user selection as shown in FIG. 6 (S12). Based upon the displayed information, a user can check the type of inserted optical disk 10 and its appropriate reproduction speed easily.

The maximum recording speed of a writable disk is displayed differently from the reproduction speed in the displaying process, which prevents the disk to be recorded on from being rotated at maximum reproduction speed through a user's accidental speed selection for recording.

When a user selects a speed to rotate a disk on the basis of the displayed speed information, the controller 61 reads the speed and address information (1 and Addr 1, 2 and Addr 2, 4 and Addr 4, or 8 and Addr 8 of FIG. 4) from the ROM 100, decides which address is related to the selected speed based on the read information, then downloads an appropriate servo control program from the location of the ROM 100, the decided address points into the interior flash memory 61a, and then executes it.

Each servo control program stored in the ROM 100 for each disk speed has different pre-determined values of the parameters for a driving voltage of the spindle motor 12b and the tracking and focussing gain etc. Therefore, when the downloaded program is executed, the driving voltages, tracking and focussing gain values etc. appropriate for the selected speed are set as control parameters of the servo 30 and the driver 21, which enables more exact servo control of the optical pickup 11 when the optical disk 10 is rotated at a selected speed (S14).

The recorded signals are extracted by the pickup 11 and are converted into binary signals by the R/F unit 20 while the disk 10 is rotating at the selected speed. The controller 61 detects (S15) the reproduction condition of the optical disk 10 by checking the characteristics of the reproduced RF signals and/or other reproduction characteristics such as the levels of tracking and focussing error signal.

For the characteristics of the reproduced RF signals, the controller 61 detects the average peak level or jitter magnitude of the reproduced RF signal being processed by the R/F unit 20. The controller 61 understands the disk reproduction condition based on the detected characteristics of the RF signals and/or the servo error signals. After the condition is understood, the controller 61 chooses the corresponding reproduction speed according to the condition information stored in the memory 62 (as shown in FIG. 5) within the maximum speed for the disk type discriminated beforehand.

For example, if the disk type is read-only such as a CD-ROM, the RF signal level is less than Vmax/2, and the jitter ratio is below 1%, the controller 61 searches for the detected level and jitter ratio in the memory 62 and confirms that the designated speed appropriate for the detected values is sixteen-times (16×) of the basic speed.

Next, the controller 61 locates the servo control program corresponding to the 16× speed, downloads it from the ROM 100 into the interior flash memory 61a to replace an existing servo control program with new servo control program, and executes the downloaded program to restart servo control. The controller 61 maintains the present servo control status until the new servo control program starts to perform servo controlling.

According to the execution of the new servo control program, the parameters for a driving voltage and tracking and focussing gain etc. set up by the previous servo control program changes their values which are control variables of the servo unit 30 and the driver 21. The changed values are appropriate for the designated speed, for example 16× speed which is appropriate for the present disk reproduction condition. Thus, the reproduction speed for the optical disk 10 is adjusted to an optimal reproduction speed according to the present disk condition and the exact servo control for that speed commences.

The reproduction operation of the optical disk 10 after the reproduction speed is changed, is carried out in the same manner as mentioned above. That is, the controller 61 continues to detect the disk condition during reproduction, and it changes the disk rotation speed to the optimal corresponding speed when the detected disk condition varies. Accordingly, the reproduction of the optical disk 10 can be accomplished under the optimal reproduction condition at all times until the disk reproduction is interrupted.

Therefore, this invention eliminates the delay time caused from gradual speed reduction due to error correction failures at each speed by automatically decreasing the current disk speed depending upon the detected disk condition in advance before frequent reproduction errors.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for controlling a speed of an optical disk, comprising the steps of:

(a) detecting a disk condition based on the characteristics of a reproduced signal from the optical disk, wherein the characteristics of said reproduced signal include the level of servo error signal and jitter magnitude; and (b) adjusting a disk speed to a pre-determined speed corresponding to the detected disk condition.

2. The method according to claim 1, wherein said characteristics further include level of high frequency reproduced signal.

3. The method according to claim 1, further comprising the step (c) of discriminating a type of the optical disk wherein said step (b) adjusts the disk speed within the maximum speed determined differently according to the discriminated disk type.

4. The method according to claim 3, wherein the step (c) further comprises re-setting variables for servo control of the optical disk according to the adjusted disk speed.

5. The method according to claim 4, wherein the variable re-setting is carried out by executing a servo control program, said program having replaced an existing one.

6. A method for controlling a speed of an optical disk, comprising the steps of:

(a) distinguishing a disk type or a disk condition based on the characteristics of a reproduced signal from the optical disk, wherein the characteristics of said reproduced signal include the level of servo error signal and jitter magnitude;

(b) displaying possible reproduction speeds on a screen according to the distinguished disk type or disk condition; and (c) executing a servo control program appropriate for the reproduction speed selected from among the displayed reproduction speeds.

7. The method according to claim 6, wherein said step (a) distinguishes the disk type from among two categories of read-only and writable.

8. The method according to claim 6, wherein said characteristics further include level of high frequency reproduced signal.

* * * * *